July 25, 1939.  W. F. VAN EWEYK  2,167,225

WATER-PURIFYING APPARATUS

Filed Nov. 28, 1936

INVENTOR
William F. Van Eweyk
BY
Charles H. Keeney
ATTORNEY

Patented July 25, 1939

2,167,225

UNITED STATES PATENT OFFICE 2,167,225

WATER-PURIFYING APPARATUS

William F. Van Eweyk, Milwaukee, Wis., assignor of one-fourth to George W. Van Eweyk, one-fourth to Chester M. Irwin, and one-fourth to Emmett P. Murphy, all of Milwaukee, Wis.

Application November 28, 1936, Serial No. 113,187

8 Claims. (Cl. 210—103)

This invention relates to improved water purifying apparatus of the portable type which is more particularly adapted for use with the ordinary standard water bottles.

One of the objects of the invention is to provide a water purifying apparatus which may be interposed between two ordinary water bottles and supported on one of the said bottles while the water from the other bottle is being purified.

A further object of the invention is to provide a water purifying apparatus in which the device containing the parts is directly and positively attached to the open end of an ordinary water bottle positioned to receive the treated water, the upper end portion of said device being adapted to receive and support an ordinary bottle filled with water to be treated and discharged into the lower bottle.

A further object of the invention is to provide a water purifying apparatus which is constructed to be supported directly upon an ordinary water bottle without requiring other means of support.

A further object of the invention is to provide a water purifying apparatus in which the purifying material within the device may be easily replaced when its purifying quality becomes diminished.

A further object of the invention is to provide a water purifying apparatus having means for easily and removably retaining the purifying material in position in the device.

A further object of the invention is to provide a water purifying apparatus having means for preventing the purifying or bactericidal metal impregnated material from corroding or eating the portions of the apparatus in direct contact with the material.

A further object of the invention is to provide a water purifying apparatus having means for aerating the purifying material, which is of granular form, without contaminating the filtered water with bacteria from the air.

A further object of the invention is to provide a water purifying apparatus which is of simple construction, is strong and durable and efficient in operation, and is well adapted for the purpose desired.

With the above and other objects in view, the invention consists of the improved water purifying apparatus and its parts and combinations as set forth in the claims, and all equivalents thereof.

In the accompanying drawing in which the same reference characters indicate the same parts in all of its views, Fig. 1 is a side view of the water purifying apparatus shown interposed between two ordinary water bottles to illustrate its manner of use;

Figure 1:
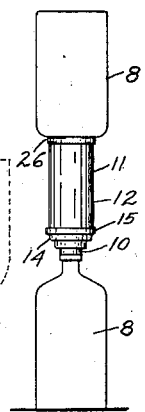
Figure 2:
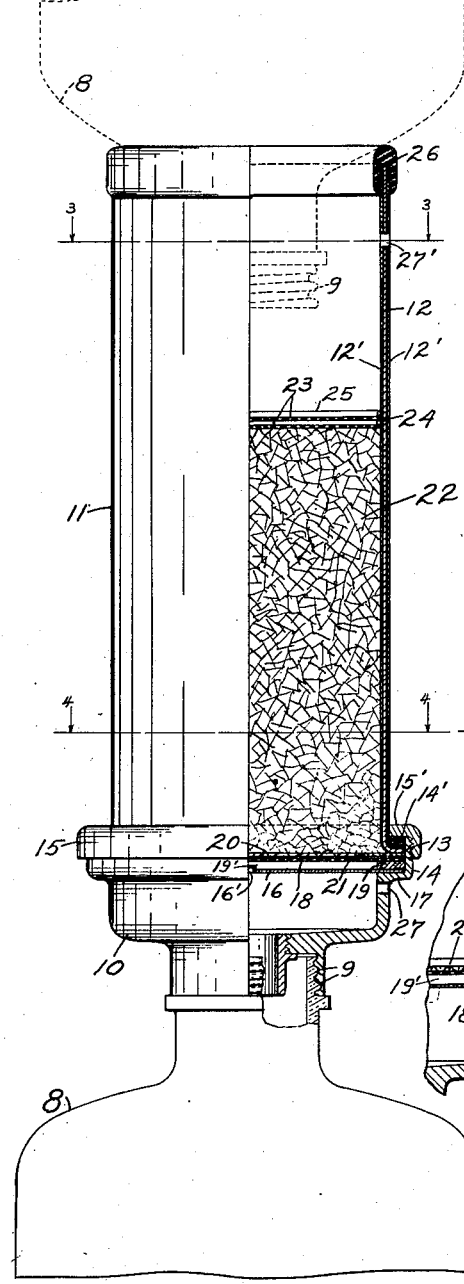
Fig. 2 is a side view partly in section, and on a larger scale, of the apparatus shown mounted on a water bottle, part of the view also showing in dotted lines, a bottle part in inverted position and supported by the apparatus.
Figure 3:
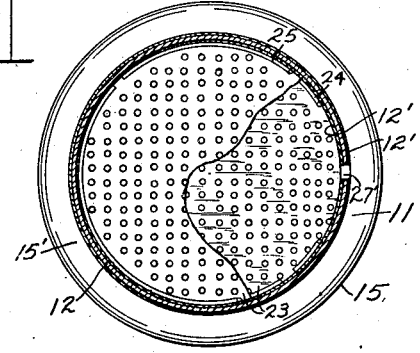
Fig. 3 is a transverse sectional view thereof taken on line 3—3 of Fig. 2.
Figure 4:
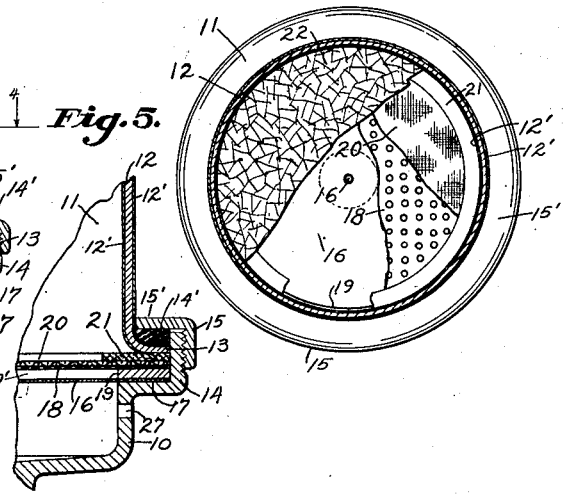
Fig. 4 is a similar view taken on line 4—4 of said Fig. 2.
Figure 5:
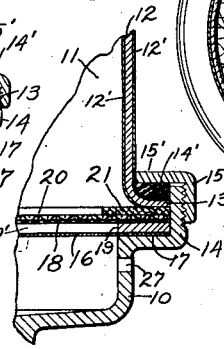
Fig. 5 is a sectional detail view, on a larger scale, of means for connecting parts of the apparatus together.

Referring to the accompanying drawing, the numeral 8 indicates two ordinary standard two quart 38 millimeter screw cap water bottles which are used in connection with this invention. The threaded neck of the lower or receiver bottle has threaded thereon the attaching discharge end 10 of the purifier 11 which comprises a cylindrical body portion or casing 12 having a lower outwardly flanged end 13 which extends into the upper open flanged portion 14 of the attaching end member or portion 10 and is retained in position therein by a flanged collar 15 threaded on the flanged part 14 of the attaching end 10. A rubber gasket 14' is interposed between the body flange 13 and the flange 15' of the collar 15 to form a water tight joint therebetween. A metal plate or closure 16 rests upon the shoulder 17 formed by the flange 14, and above the plate is positioned a perforated metal plate or screen 18 separated from the plate 16 by a cork gasket 19. A silver impregnated fabric screen 20, preferably formed of horsehair, rests upon the perforated plate 18 and a fibre gasket 21 is interposed between the fabric and the flange 13 of the body portion. As thus positioned the said parts are firmly clamped in position when the collar 15 is threaded down on the flange 14.

The plate 16 closes the lower end of body portion and is provided with a small central upwardly flanged discharge opening 16' to permit the purified water to flow from the purifier 11. The space 19' between the plate 16 and the screen 18 permits the water being purified to flow through all exposed portions of the screen, the upward flanged portion preventing any sediment from flowing out with the water and into the space to flow through the opening 16'.

The body portion is partly filled with silver impregnated partly exhausted zeolite 22, in granular form, as this purifying or sterilizing agent has been found to be very efficient in use for purifying water and other liquids.

Two perforated metal screens 23 spaced apart by a split ring 24 are positioned above the purifying material and a split ring 25 is positioned above the upper screen. The split rings hold the screens in position and also the zeolite and further prevent the larger particles of foreign matter in the water from getting into the body of granular material.

The upper open end of the body portion 12 is provided with a rubber or cushion ring 26 upon which the inverted bottle 8 rests when it is desired to empty its contents into the body portion to be purified and then discharged into the lower bottle 8.

To prevent the formation of vacuum pockets within the apparatus the lower attaching part 10 and the body portion 12 are provided with vent openings 27 and 27' which permit the free flow of air therethrough without causing the air to flow upwardly through the filtered water as in water apparatus in ordinary use.

It has been found that the silver impregnated zeolite has a tendency to corrode or eat through metals other than silver, and to eliminate this objectionable feature the body portion or casing 12 is made of or coated with a vitreous enamel or other non-conductive or non-metallic substance 12' which completely prevents said corrosive action. The upper screens 23 and the split rings 24 and 25 are silver plated and the fabric screen 20 is impregnated with silver to protect the fabric and the metal screen 18 from the deleterious action of the sterilizing medium used. To give the medium sufficient time to act upon the water different size openings in the plate 16 may be provided to control the flow of water through the apparatus.

In use the apparatus is threaded upon an empty ordinary two quart water bottle which forms its only support, and a filled two quart bottle of raw water is placed in an inverted position in the upper open end of the apparatus. The water in the upper bottle will discharge therefrom into the apparatus and through the sterilizing medium and be purified thereby. The purified water will then flow through the small central discharge opening 16' directly into the lower bottle. After being filled the apparatus is unscrewed from the bottle and the bottle may be then capped and placed in a refrigerator or other place for final disposition of its contents.

This operation may be repeated for months and when the sterilizing medium becomes weaker with use it may be easily and inexpensively replaced.

The apparatus may be also used for softening water by substituting therein ordinary water softening zeolite for the silver impregnated material. This use is particularly adapted, although not solely, for dental and medical use. Other granular water purifying materials may also be used such as manganese zeolite for removal of iron, etc.

From the foregoing description it will be seen that the water purifying apparatus is of very simple construction and is well adapted for the purpose described.

What I claim as my invention is:

1. A water purifying apparatus, in combination, a lower receiving bottle having a threaded neck, an upper raw water discharging bottle, both bottles being commercial bottles of ordinary construction, a water purifier body portion interposed between the two bottles and threaded on the neck of the lower bottle, the upper bottle being inverted and resting upon and extending partly within the upper portion of the body portion, the body portion having a vent opening for the upper bottle and a vent opening for the lower bottle, and a sterilizing and purifying medium within the body portion and through which the raw water flows in passing from the upper to the lower bottle.

2. A water purifying apparatus, in combination, a lower receiving bottle having a threaded neck, a water purifier body portion having a lower threaded portion engaging the threaded neck of the bottle and supported thereby, a closure for the lower portion of the body portion and having a discharge opening therein, spaced screens within the body portion, an upper raw water discharging bottle being inverted and extending into and supported by the upper open end of the body portion, said body portion having a vent opening for the upper bottle and a vent opening for the lower bottle, both bottles being similar commercial bottles of ordinary construction, and a sterilizing medium within the body portion and between the screens and through which the raw water flows by gravity in passing from the upper to the lower bottle, both bottles being open to the outside air at all times.

3. A water purifying apparatus, in combination, a lower receiving bottle having an outer threaded neck, a water purifier body portion having a lower inner threaded portion engaging the threaded neck of the bottle and supported thereby, a closure for the lower portion of the body and having a discharge opening therein, spaced screens within the body portion, said body portion having an air opening below the screens and one above the screens to permit free flow of air to and from both bottles during the purifying process, an upper raw water discharging bottle extending into and supported by the upper open end of the body portion, both bottles being similar commercial bottles of ordinary construction and interchangeable, and a sterilizing medium within the body portion and between the screens and through which the raw water flows in passing from the upper to the lower bottle.

4. A water purifying apparatus for use with a pair of commercial bottles of ordinary construction, comprising a body portion having open ends, the upper open end permitting the neck of an inverted bottle to extend therein, a closure for the lower open end and having a small discharge opening, a bottle connecting end portion extending downwardly from the body portion, spaced screens within the body portion above the closure, and a sterilizing medium within the body portion between the screens, the apparatus having an air opening above and below the screens for the free flow of air at all times to both bottles.

5. A water purifying apparatus for use with a pair of interchangeable commercial bottles of ordinary construction, comprising a body portion having open ends, the upper open end permitting the neck of an inverted bottle to extend therein, a bottle connecting end portion secured to the lower end of the body portion, a closure for the body portion interposed between the said body portion and the bottle connecting portion and having a small discharge opening, spaced screens within the body portion above the closure, a fabric screen above the lower screen, the apparatus having an air opening above and below the screens for the free flow of air at all times to both bottles, and a sterilizing medium within the body portion between the fabric screen and the upper screen.

6. A water purifying apparatus for use with a pair of interchangeable commercial bottles of ordinary construction, comprising a cylindrical body portion open at both ends and having an inner non-conductive surface, the upper open end permitting the neck of an inverted bottle to extend therein, a bottle connecting end portion, secured to the lower end of the body portion, a closure for the lower end of the body portion interposed between the body portion and the bottle connecting portion and having a small discharge opening, a screen positioned above the closure, a screen positioned adjacent the upper end of the body portion, a fabric screen positioned above the lower screen, said apparatus having an air opening below the lower screen and above the upper screen for the free flow of air at all times to both bottles, and a sterilizing medium within the body portion between the fabric screen and the upper screen.

7. A water purifying apparatus for use with a pair of interchangeable bottles of ordinary construction, and silver impregnated zeolite as a purifying medium, comprising a cylindrical body portion open at both ends and having an inner vitreous enamel or non-conductive surface, a bottle connecting end portion secured to the lower end of the body portion, the upper open end permitting the neck of an inverted bottle to extend therein, a closure for the lower end of the body portion interposed between the body portion and the bottle connecting portion and having a small medially positioned discharge opening, a lower screen positioned above and in spaced relation to the closure, a silver impregnated fabric screen mounted on the lower screen, spaced silver plated metal screens positioned in the upper part of the body portion, said apparatus having an air opening below the lower screen and above the upper screens for the free flow of air at all times to both bottles, and a silver impregnated zeolite sterilizing medium within the body portion between the fabric screen and the silver plated screens.

8. A water purifying apparatus for use with a pair of interchangeable commercial bottles of ordinary construction, and a silver impregnated zeolite as a purifying medium, comprising a cylindrical body portion open at both ends and having an inner non-conductive surface the upper open end permitting the neck of an inverted bottle to extend therein, the lower end of the body being outwardly flanged, a bottle connecting end portion having an upwardly flanged portion, a coupling member engaging the body flange and having a threaded engagement with the end portion flange to firmly connect the parts together, said end portion having a lower threaded portion for connection with the threaded neck of a water bottle, a closure for the lower end of the body portion and having a small discharge opening, a lower screen positioned above and in spaced relation to the closure, a silver impregnated fabric screen mounted on the lower screen, spaced silver plated metal screens positioned in the upper part of the body portion, said apparatus having an air opening in the lower end portion and in the body portion above the spaced screens to both bottles, and a silver impregnated zeolite sterilizing medium within the body portion between the fabric screen and the spaced screens for the free flow of air at all times.

WILLIAM F. VAN EWEYK.